US010532646B2

(12) United States Patent
Shapiro

(10) Patent No.: US 10,532,646 B2
(45) Date of Patent: Jan. 14, 2020

(54) METHOD AND APPARATUS FOR RECOVERING ENERGY WHEEL

(71) Applicant: Benjamin Shapiro, Greenacres, FL (US)

(72) Inventor: Benjamin Shapiro, Greenacres, FL (US)

(73) Assignee: REWHEEL, INC, Dover, DE (US)

( * ) Notice: Subject to any disclaimer, the term of this patent is extended or adjusted under 35 U.S.C. 154(b) by 0 days.

(21) Appl. No.: 16/373,531

(22) Filed: Apr. 2, 2019

(65) Prior Publication Data

US 2019/0291562 A1    Sep. 26, 2019

Related U.S. Application Data

(63) Continuation-in-part of application No. 15/715,136, filed on Sep. 25, 2017, now Pat. No. 10,279,785.

(51) Int. Cl.
| | | |
|---|---|---|
| *B60T 1/10* | (2006.01) | |
| *B60K 6/12* | (2006.01) | |
| *F16D 61/00* | (2006.01) | |
| *F15B 1/027* | (2006.01) | |
| *B60K 7/00* | (2006.01) | |
| *B60B 7/20* | (2006.01) | |

(52) U.S. Cl.
CPC .................. *B60K 6/12* (2013.01); *B60B 7/20* (2013.01); *B60K 7/0015* (2013.01); *B60T 1/10* (2013.01); *F15B 1/027* (2013.01); *F16D 61/00* (2013.01)

(58) Field of Classification Search
CPC ........ B60T 1/10; F16D 61/00; Y02T 10/6208; B60K 6/12

USPC .................................... 180/165, 308; 60/414
See application file for complete search history.

(56) References Cited

U.S. PATENT DOCUMENTS

| | | | | |
|---|---|---|---|---|
| 3,932,076 A | * | 1/1976 | Thibault | B60K 7/0015 418/177 |
| 4,061,200 A | * | 12/1977 | Thompson | B60K 25/08 180/165 |
| 4,069,669 A | * | 1/1978 | Pitkanen | B60K 6/105 416/60 |
| 4,111,618 A | * | 9/1978 | Thibault | F01C 1/3566 180/308 |
| 4,223,532 A | * | 9/1980 | Shiber | B60K 6/12 60/414 |
| 4,364,229 A | * | 12/1982 | Shiber | B60K 6/105 60/414 |

(Continued)

FOREIGN PATENT DOCUMENTS

| | | | | | |
|---|---|---|---|---|---|
| GB | 2346193 A | * | 8/2000 | ............ | B60T 1/065 |
| GB | 2348673 A | * | 10/2000 | ............ | B60T 1/10 |
| JP | 57186520 A | * | 11/1982 | ............ | B60K 25/08 |

*Primary Examiner* — Ruth Ilan

(57) ABSTRACT

The present invention introduces a retrofit method of regenerative braking where no components of an automobile are to be replaced or removed and none of their functionality is modified. The recovering energy system is implemented as an additional, one piece, complete device, placed onto the existing automobile wheel's hub, and covered by the automobile's wheel. The system includes a housing, turbines, accumulators, and valves which act to both store and dispel energy as needed. This method of regenerative braking is therefore applicable to all the automobiles, independent or their power source, to newly built automobiles and those already on the road.

4 Claims, 7 Drawing Sheets

(56) References Cited

U.S. PATENT DOCUMENTS

| | | | | |
|---|---|---|---|---|
| 4,663,935 | A | * | 5/1987 | Rohde ............... B60C 5/004 |
| | | | | 417/233 |
| 5,323,688 | A | * | 6/1994 | Walker ................ B60K 6/12 |
| | | | | 180/242 |
| 5,799,562 | A | * | 9/1998 | Weinberg ............ F01B 3/02 |
| | | | | 60/414 |
| 6,719,080 | B1 | * | 4/2004 | Gray, Jr. ............. B60K 6/12 |
| | | | | 180/165 |
| 7,263,828 | B2 | * | 9/2007 | Iwanami ............ F01C 13/00 |
| | | | | 290/43 |
| 7,992,948 | B2 | * | 8/2011 | Swain ................. B60K 6/12 |
| | | | | 188/24.11 |
| 2003/0019675 | A1 | * | 1/2003 | Haas .................. B60K 7/0007 |
| | | | | 180/65.6 |
| 2005/0178115 | A1 | * | 8/2005 | Hughey ............. B60K 6/12 |
| | | | | 60/413 |
| 2006/0137927 | A1 | * | 6/2006 | Fleming ............. B60K 6/48 |
| | | | | 180/165 |
| 2010/0219681 | A1 | * | 9/2010 | Rini ................... B60K 6/12 |
| | | | | 303/152 |
| 2011/0100740 | A1 | * | 5/2011 | Schneidewind ..... B60K 6/105 |
| | | | | 180/165 |
| 2011/0180340 | A1 | * | 7/2011 | Peaslee .............. B60K 6/12 |
| | | | | 180/165 |
| 2014/0166387 | A1 | * | 6/2014 | Achten ............... B60K 6/12 |
| | | | | 180/242 |
| 2014/0219848 | A1 | * | 8/2014 | Rabhi ................ F16C 33/306 |
| | | | | 418/24 |
| 2015/0204354 | A1 | * | 7/2015 | Krittian ............. B60K 6/12 |
| | | | | 60/413 |
| 2016/0114670 | A1 | * | 4/2016 | Resch ................ B60B 27/0015 |
| | | | | 180/308 |

* cited by examiner

Neutral State

Braking state

Accelerating State

METHOD AND APPARATUS FOR RECOVERING ENERGY WHEEL

Continuation in Part to the application Ser. No. 15/715,136 filed on Sep. 25, 2017

The present invention relates to several key issues:
protecting and improving the quality of the environment
saving energy resources and minimizing the need for importing additional energy resources
making driving automobiles more affordable

TECHNICAL FIELD

1. Field of the Invention

The invention relates generally to conserving the energy and protecting the planet's environment. More precisely it relates to the different methods of conservation of kinetic energy of automobiles via regenerative braking, and capturing and saving this energy within an automobile.

2. Background of the Invention

Natural resources are too valuable to be wasted.

Natural resources used to produce fuel for automobile combustion engines are too valuable. Producing the electricity, which is required to power electrical cars, for the most part also still requires burning the same fossil fuels, oil, gas, and coal.

US consumption of Gasoline

"In 2014, about 136.78 billion gallons[1] (or 3.26 billion barrels) of gasoline were consumed[2] in the United States, a daily average of about 374.74 million gallons (or 8.92 million barrels).[3] This was about 4% less than the record high of about 142.35 billion gallons (or 3.39 billion barrels) consumed in 2007."

http://www.eia.gov/tools/faqs/faq.cfm?id=23&t=10

Price of Gas

"The average price of gas in February was $2.23 per gallon, which was the cheapest February average since 2009. The average in February 2014 was $3.34 per gallon". (last to years average=$5.57/2=$2.77/per gallon)"

newsroom.aaa.com/tag/gas-prices/

That is, yearly expenses for consumers to fill their cars with gas represent 136.78 billion gallons×$2.77/gallon=$378.88 billion/

US Oil Import Expenses

"The United States imported approximately 9 million barrels per day (MMbbl/d) of petroleum in 2014 from about 80 countries."

http://www.eia.gov/tools/faqs/faq.cfm?id=727&t=6

31.5 gallons/barrel×9 million barrels=283.5 Million gallons/day 103.5 billion gallons/year out of 136.78 billion gallons is imported.

BACKGROUND ART

Re: Regenerative Braking

Regenerative braking is the method of saving kinetic energy within the automobile's system during the braking process.

When no kinetic energy of a moving automobile is saved within the system of the automobile by being converted into some other form of energy at the time of applying the breaks, all that energy that was generated (for example by a combustion engine) and applied into giving this automobile a specific momentum, is lost. That energy is lost into destruction of matter (brakes) and heat produced during that process. The heat is released into the atmosphere and the destructed material (brakes) will require replacement.

Known methods of regenerative braking (https://en.wikipedia.org/wiki/Regenerative_brake) or "kinetic energy recovery system" (https://en.wikipedia.org/wiki/Kinetic_energy_recovery_system) include:

(a) fly wheel—proven not practical for the reason (too heavy, not allowing to change the direction of the automobile—horoscope effect—saving its own momentum of movement, loosing this saving energy with time)

(b) electrical engine working in electrical generator mode, and (c) a relatively new technology of keeping transformed kinetic energy within compressed gas tanks requiring a reworked transmission system, hydraulic pumps and several gas tanks.

EXAMPLE

"The Hybrid Air Powertrain uses a hydraulic pump and a piston to the nitrogen gas in a tank called the high-pressure accumulator.

Hitting the accelerator releases the pressurized gas, which then moves hydraulic fluid through the same pump in reverse. The pump acts as a motor to power the wheels and the hydraulic fluid ends up in a second tank.

The Hybrid Air Car uses compressed nitrogen, which is held in a tank called the high-pressure accumulator.

A hydraulic pump and piston compress nitrogen in the accumulator.

When the nitrogen is released (by pressing the accelerator), the pump runs in reverse. Acting now as a motor, harnesses the energy of the moving hydraulic fluid to send power to the wheels. After the hydraulic fluid passes through the motor, it flows to the low-pressure accumulator, where it is stored for later use." (see pic. Car-runs-air) http://www.popsci.com/article/cars/car-runs-air"

The above described technology (c) forcing for replacing the power train, is in effect rebuilding the automobile. In contrast, the presented here invention is only requiring an addition to the existing automobile's wheel.

Re. Electric Cars

While the battery life keeps increasing with new inventions, the drawbacks are in the following. Electricity still has to come from somewhere. The most common way of generating electricity today is still by burning fossil fuels. i.e. gas, coal, and oil, which still pollutes the atmosphere and thus defeats the promise of green energy for electrical cars.

Regenerative Braking within Electrical Cars.

The process of charging electrical batteries takes time. The efficiency of this process is low. The part of the amount of an automobile's kinetic energy (which is saved by an electrical motor working in generator mode) is insignificant for the reason of a relatively low amount of electricity generated in this mode and the speed at which a battery can accumulate the charge. The relatively small motor/generator within an automobile cannot produce the same electrical power that is obtained from a high voltage electrical line being used to charge these batteries overnight.

SUMMARY OF THE INVENTION

The tradition holds that a wheel is to be driven by some other device, i.e. an engine. The understanding that a wheel can itself be its own engine is a fundamentally new. The present invention re-invents the wheel by having it serve as its own engine.

The kinetic energy of the automobile is absolutely represented by the rotation of the wheel. While traditionally the wheel is the target of an engine, this device constructed on the wheel itself, is allowing the wheel to power itself.

To better understand the reasoning behind the invention please imagine the following:
(i1) if there would be no losses of energy caused by the friction between the tire and the road AND
(i2) if there would be no losses of energy due to the air resistance to the moving vehicle
THEN giving the car the original momentum of movement, capturing all that kinetic energy during braking and then reapplying that same energy for acceleration, would require no additional power (electrical or combustion engine power).

It is, of course, not possible to have such ideal conditions (i1) and (i2) so the external power constantly substituting for the losses would always be needed. Additionally, some loss of energy is still unavoidable during the process of the conversion from the automobile's kinetic energy to the potential energy saved within the automobile, the efficiency of the energy conservation within the described here apparatus is much higher than can be provided by an electrical engine working in electrical generator mode.

The presented here invention is different from known in the art methods of conserving kinetic energy of automobile via regenerative braking. The apparatus of this invention is built on top of traditional automobile's wheels. Therefore, the only component affected when implementing this technology of energy conservation on the automobiles already on the road or newly constructed automobiles is the wheel and does not require the reconstruction of the entire powertrain like in the mentioned above example (c).

Being built on the wheel, this technology offers the application to all the automobiles independent of the energy source used to power them. It is applicable to the existing on the road automobiles as well as to the newly designed automobiles.

Applications of the Method and Apparatus for Recovering Energy Wheel (ReWheel) to Traditional Automobiles Presented here system and apparatus is not using electricity or gasoline for its power.
It, however, can be added for additional power and as an energy saving device to any existing on the road today automobile as simply as it is to replace the wheel. The original wheels are still being used. The operation can be performed by any auto mechanic or mechanically oriented auto user.
The effects are all of the following:
providing additional saving to the world's natural resources
minimizing air pollution done today by excessive use of combustion engines and by excessive production of electricity
allowing for less expenses for the auto users going into powering their vehicles
providing additional power to automobiles on all the wheels where the device is installed
consequently, upgrading two wheel powered automobiles into four wheel powered automobiles This upgrade is possible for all existing types of automobiles, including the following:
traditional combustion engine automobiles;
electric automobile
hybrid automobiles
from any other type of energy powered automobiles
The use of ReWheel device requires the following three (3) simple steps to be done on either two (2) or all four (4) wheels of the automobile:
1. Taking off the original wheel
2. Putting the ReWheel device on the place of the original wheels
3. Attaching the original wheel to the ReWheel device.

BRIEF DESCRIPTION OF THE DRAWINGS

Presented here invention can be readily understood by considering the following detailed description with the accompanying drawings.

DETAILED DESCRIPTION OF THE PREFERRED EMBODIMENT

Figure 1:
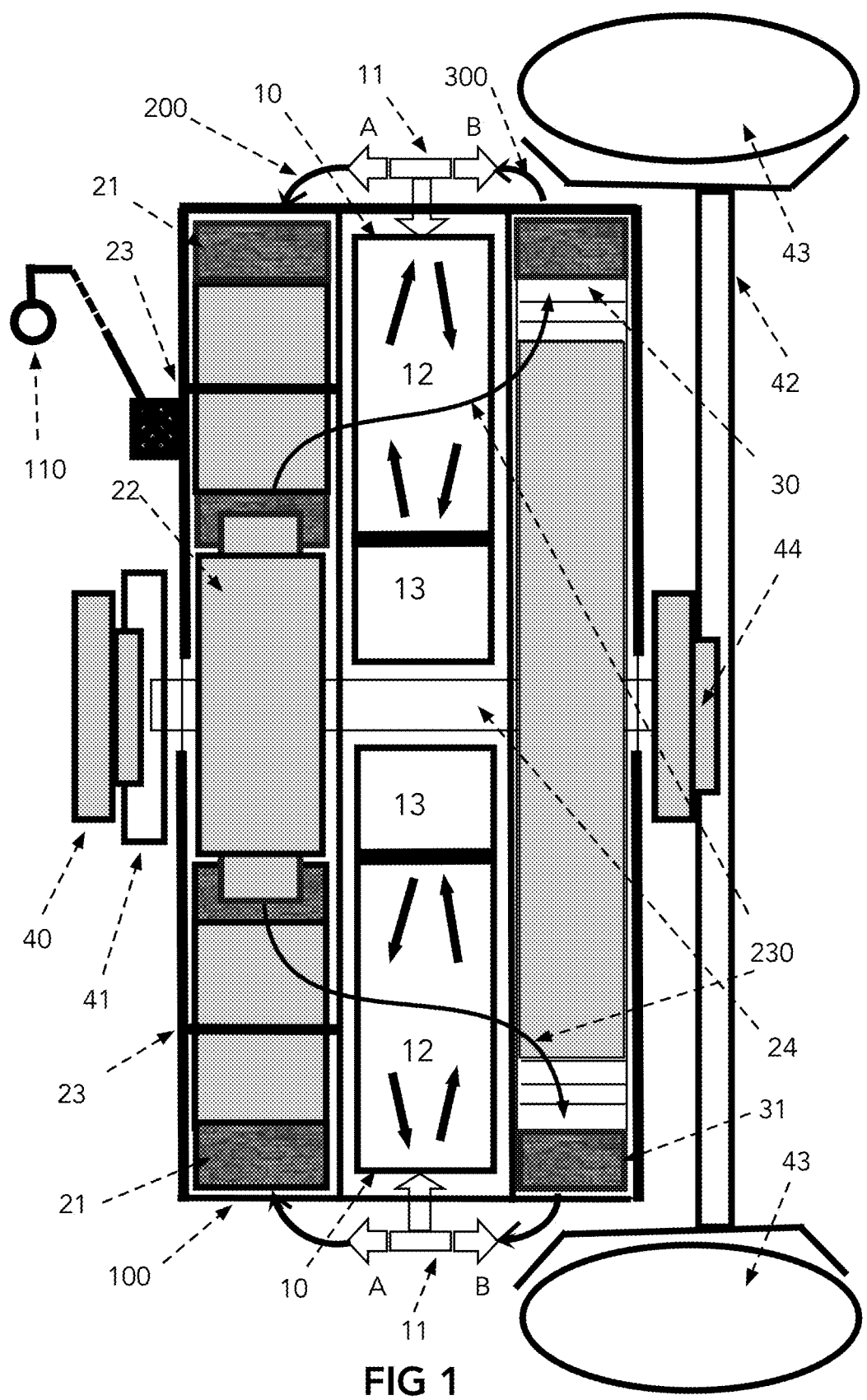
FIG. 1. The ReWheel Device—Preferred embodiment.
100 ReWheel body
110 Stationary Connector
200 Fluid Stream at Acceleration Time
230 Fluid Passage Back to Braking Turbine
300 Fluid Stream at Braking Time
10 Accumulator
11 3-way valve
12 Pressured Fluid
13 Pressured Gas
21 Accelerator Gear Blades
22 Central Gear
23 Accelerator Gear Axle
24 Extended Axle
30 Braking Turbine
31 Braking Turbine Blades
40 Original Hub
41 Connector to Original Hub
42 Original Tire Rim
43 Original Tire
44 Secondary Hub
FIG. 2. The ReWheel Device—Alternative Embodiment 1.
7A open/close valves
7B open/close valves
700 Cone or other gear type is controlling the speed.
701 This turbine is locked to the rim
702 Rim
709 Air pumping pistons
710 Accumulator
721 Accelerator turbine
724 Extended axle
730 Braking turbine
741 Reverse Rotation direction disk with controlled speed
742 Sitting on the extended wheel's axle disk
743 Tire
7110 Stationary Connector
7200 At acceleration time, the compressed gas, pressing on the liquid is forcing the acceleration turbine blades forward
7230 Passage between the accelerating turbine and braking turbine. Arrow shows direction of liquid during braking
7300 At braking time the liquid from the braking turbine is forcing the acceleration turbine backwards while compressing the air
7410 Braking turbine axle
FIG. 2A. The ReWheel Device—Alternative Embodiment 1—example of reverse rotation direction mechanism 1 first disk and its rotation direction
2 cone or other gear type between two disks
3 second disk rotating in different direction
FIG. 2B. The ReWheel Device—Alternative Embodiment 1—Air pumping pistons.

Referring to FIG. 1, the ReWheel (Recovering Energy Wheel) device, of the shape of a cylinder, is added to the traditional automobile's wheel in the place between the traditional Rim and the traditional wheel Hub.

The ReWheel device operates like a powerful spring placed inside the automobile's wheel, transforming the kinetic energy of a moving automobile into potential energy of compressed gas during the braking process and then transforming back that potential energy of compressed gas into kinetic energy of the automobile during acceleration process.

The ReWheel device is connected to the Original Hub (40) sitting on the original wheel, by the Original Hub Connector (41). Original Hub Connector (41) extends the original axle by the Extended Wheel Axle (24), going all the way until the Secondary Hub Connector (44).

The Original Hub Connector (41), is taking the place that would normally be taken by the Original Tire Rim (42). The Original Tire Rim (42) with mounted on it Original Tire (43) is being connected instead to the Secondary Hub Connector (44).

The body of the device, ReWheel Body (100), is kept stationary by the Stationary Connector (110). The Stationary Connector (110) is, in turn, connected to the part of an automobile's tire suspension system, which is always stationary to the wheel's axle. It can, for example, be connected to the upper ball joint or its equivalent.

This FIG. 1. shows two accumulators (10) located in the direction of radius coming out of the Extended Wheel Axle (24), having their pressured gas side towards the axle. The ReWheel device can utilize multiple accumulators, each of them being connected to 3-Way-Valves (11) without changing the principle of the device's operation.

There are number of turbine-like components within this implementation of the ReWheel. One, is the Braking Turbine (31) and the others are the Accelerator Gears (21). This implementation shows two Accelerator Gears (21) standing on the opposite sides of the Central Gear (22), which is being driven by the Accelerator Gears (21). The Central Gear (22) is hard connected to and is rotating on the Extended Wheel Axle (24).

The Accumulators (10) are pre-charged with Pressured Gas (13), inert gas, like Nitrogen. Originally the other side of the accumulator is not charged. The Pressured Fluid (12) then comes to the accumulator during the braking process and further compressing the Pressured Gas (13). Since the fluid we use in this implementation is oil which is virtually not compressible under pressure, and since it can change its shape and direction based on the pipes it is going through, makes it a perfect conductor of force.

The 3-Way Valves (11) controlled by any mechanical or electronic device, are, in turn controlling the braking and acceleration of the automobile. They can be in any of the following 3 states: Neutral state—when all Braking (B) and Accelerating (A) valves are closed; Acceleration state, when braking valves (B) are closed and acceleration valves (A) are open, causing Fluid Stream at Acceleration Time (200), which in turn is causing the Accelerator Gears (21) to rotate faster, in turn rotating the Central Gear (22); and Braking state, when accelerating valves (A) are closed and braking valves (B) are opened, causing Fluid Stream at Braking Time (300), which is causing further compression of the Pressured Gas (13) and further charging the accumulators with potential energy of compressed gas (13), which process is in turn causing the automobile to brake as every force has a counter force.

The change in the state of the device, causing braking of the automobile and transforming the energy from kinetic to potential is implemented as follows. At the neutral state of the device (no braking and no acceleration) the Braking Turbine (30), hard connected and positioned on the Extended Wheel Axle (24) is rotating along with the Original Tire (43). The fluid positioned between the Braking Turbine Blades (31) rotates without any pressure applied to it.

The Fluid inside the ReWheel device for the largest part is always located between the blades of the Braking Turbine (30) and in compressed state (12) within Accumulators (10).

Braking State.

When braking of the automobile is desired, the following is done: Port B of the 3-Way-Valve (11) is opened (port A can only be closed at this time); and special blocks are set to move out and back in to block the free rotation of the fluid.

The movement of the blocks is synchronized with the rotation of the blades not to block the blades and to only block the liquid in between the blades.

Blocking the liquid is putting pressure on the Braking Turbine Blades (31). Since the Braking Turbine (30) is placed on the same Extended Axle (24) as the Original Tire Rim (42), blocking the liquid works against the rotation of the Original Tire (43). The inertia of the moving car is creating the counter force, which in turn forces the Fluid Stream at Braking Time (300) in the accumulators (10) through the, open at this time, port B of the 3-Way-Valve.

Acceleration State.

When acceleration of the car is desired, port A of the 3-Way-Valve (11) is opened (port B can only be closed at this time).

The Pressured Gas (13) is then able to force the Pressured Liquid (12), creating the Fluid Stream at Acceleration Time (200) to hit the Blades of the Accelerator Gears (21). The Accelerator Gears (21) are in turn rotating the connected to them Central Gear (22), which is standing on the same Extended Axle (24) connected to the Original Rim (42). Used during the acceleration process liquid is then passed back to the Braking Turbine blades (31), via the Fluid Passage back to Braking Turbine (230). At this time the braking turbine is rotating without a load, with no pressure on its blades, and with available space for the liquid in between its blades.

Neutral State.

Both ports of the 3-Way-Valves (11) are closed. All the turbines are rotating freely.

Detailed Description of the Alternative Embodiment-1

Figure 2:
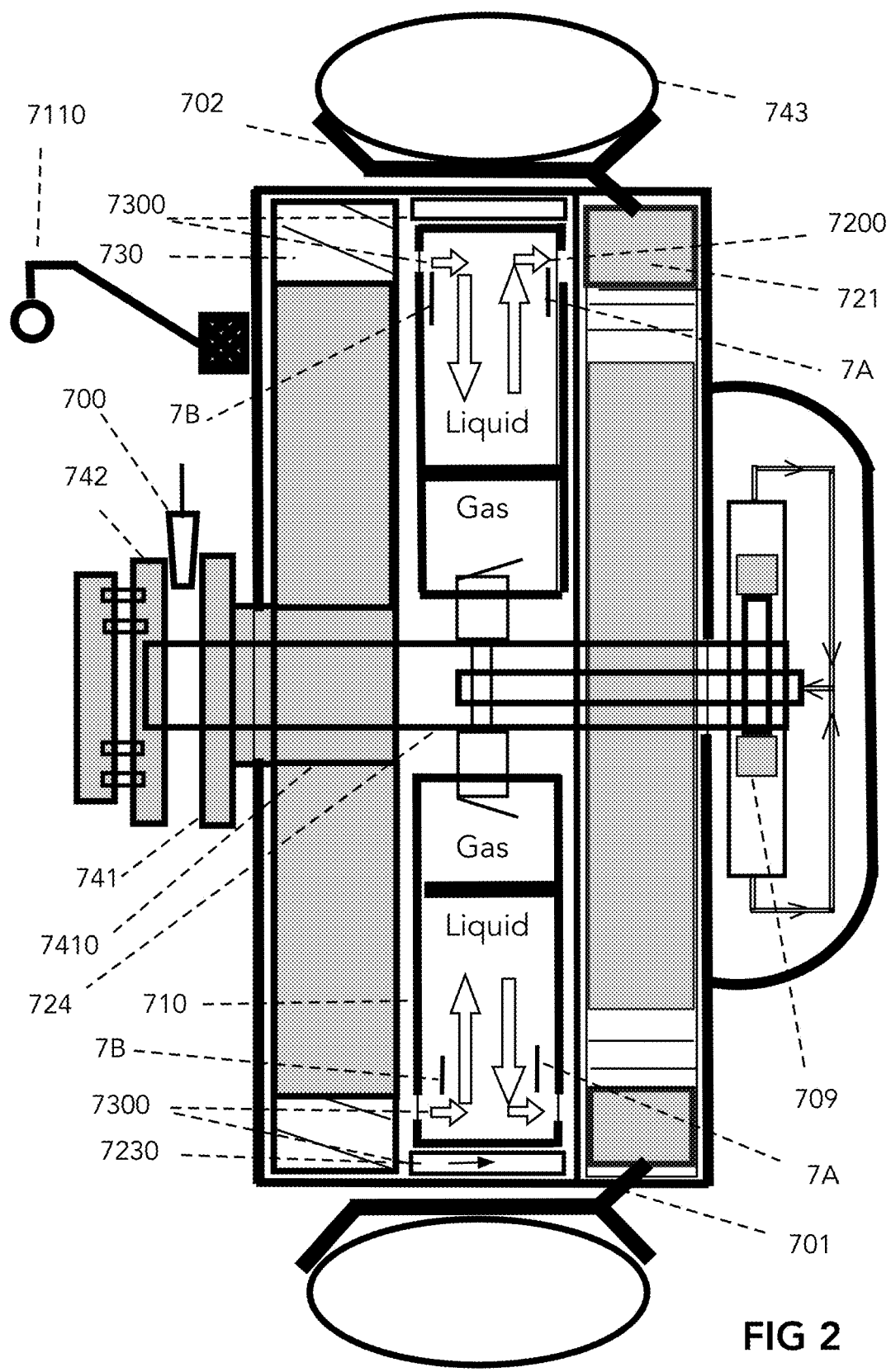

FIG. 2. Shows Alternative Embodiment-1.

This figure is also showing two volumes within high pressure cylinders (accumulators). One side of each cylinder is filled with liquid and the other side with gas.

Here, as well, the accumulators are used within the construction being an addition to the automobile wheel's rim and positioned on the extended automobile wheel's axle (724).

Here, as well, the gas compressed during the deceleration of the automobile serves as the storage of energy.

Here, as well, the liquid is being the conduit of force between the pressure on the blades within the rotating turbines and compressed gas. At times the gas is referred to as "air", however the only important qualities of these components are "liquid" and "gas". An inert gas, i.e. nitrogen, is more appropriate in this case.

The turbines, sitting on the same axle as the wheel's rim, affect the rotation of the rim.

On this FIG. 2 we have depicted two turbines, the braking turbine (730) on the left and the accelerating turbine (721) on the right, with the two accumulators (710) in between. Rim (702), locked, by the connection 701, to the accelerating turbine (721) on the right, placed on the gears of the extended wheel's axle (724), i.e. both are always rotating with the same speed.

Acceleration:

The compressed gas which is pressing on the liquid, which in turn is pressing on the specially angled blades of the acceleration turbine (721), is causing the acceleration. The used for acceleration liquid is then allowed to come in between the blades of the braking turbine (730) on the left via the passage between the accelerating turbine and braking turbine (7230).

At this time the braking turbine (730) and the liquid between its blades are freely rotating in the same direction as the acceleration turbine (721). This rotation is ensured by the liquid coming from the accelerating turbine (721) and the angle of the blades of the braking turbine (730).

Braking:

As seen on the FIG. 2, when the braking turbine axle (7410) moves to the left to perform braking the reverse rotation direction mechanism, (the cone or other gear type (700) and the reverse rotation direction disk (741)), is used to connect the freely rotating braking turbine (730) with the sitting on the extended wheel's axle disk (742).

That makes the braking turbine (730) to start rotating in the direction opposite to the rotation of the wheel (743). The angle of the turbine's blades affects the liquid to be pushed in the direction opposite to where it came from, i.e. in the direction shown in (7230) towards the accelerating turbine (721), which is sitting on, and is being locked to the extended wheel axle (724). The liquid is now pressing against the rotation of the accelerating turbine (721) and therefore against the rotation of the wheel (743), which in turn is causing the automobile to brake, while compressing the air, as shown by the (7300). Additionally, at the time when the braking turbine axle moves to the left to perform braking, air pumping pistons (709) get connected to the power-train axle.

Figure 2A:
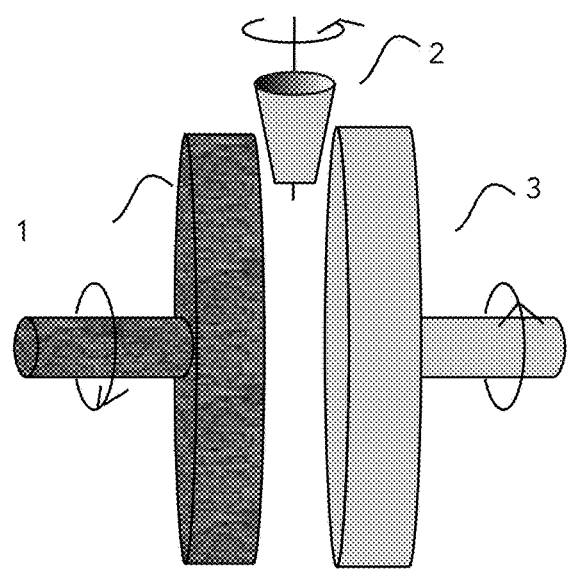

When the braking turbine axle, (7410) on which the 2-1 rotation direction disk (741) is positioned, moves to the left, it makes a connection with the sitting on the extended wheel axle (724) disk (742) via the cone or other gear type (700). The working of the reverse rotation direction mechanism is obvious when looking at FIG. 2A. The two disks connected in such way have to rotate in different directions. This is possible since the braking turbine (730) can rotate freely around the extended axle (724) without having a hard connection to the axle (724).

Figure 2B:
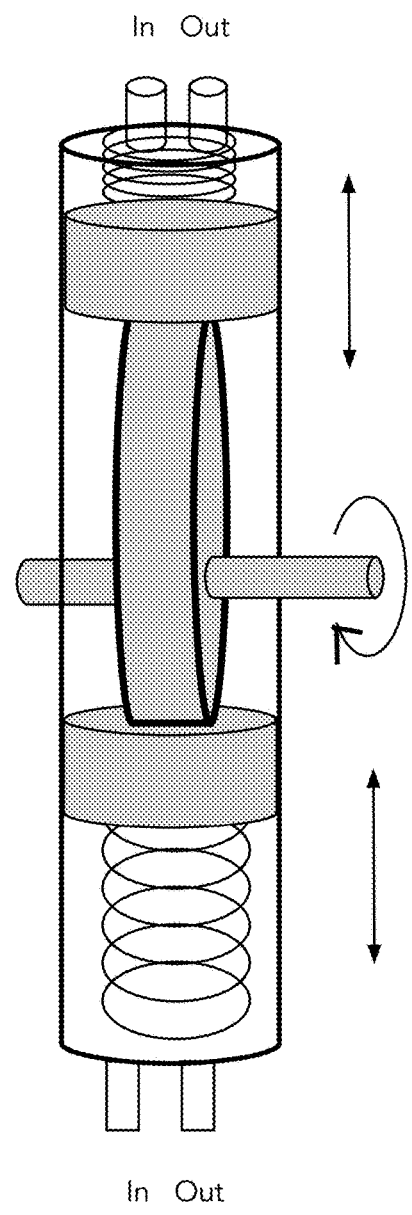

One of the possible implementations of air pumping pistons (709) is seen on FIG. 2B.

As it is usually done in the art, the transformation of circular movement into linear directional movement is performed via non-centrically positioned on an axle disk causing the movement of the linear direction moving objects by pushing them by the perimeter of the disk.

In our case the non-centrically positioned disk is sitting on the extended axle (724) and is pushing the air pumping pistons (709). The task of the air pumping pistons (709) is either setting up the initial pressure of the gas within accumulators (710), or potentially keeping up with that pressure in the case of gas leakage.

Detailed Description of the Alternative Embodiment-2

Figure 3:
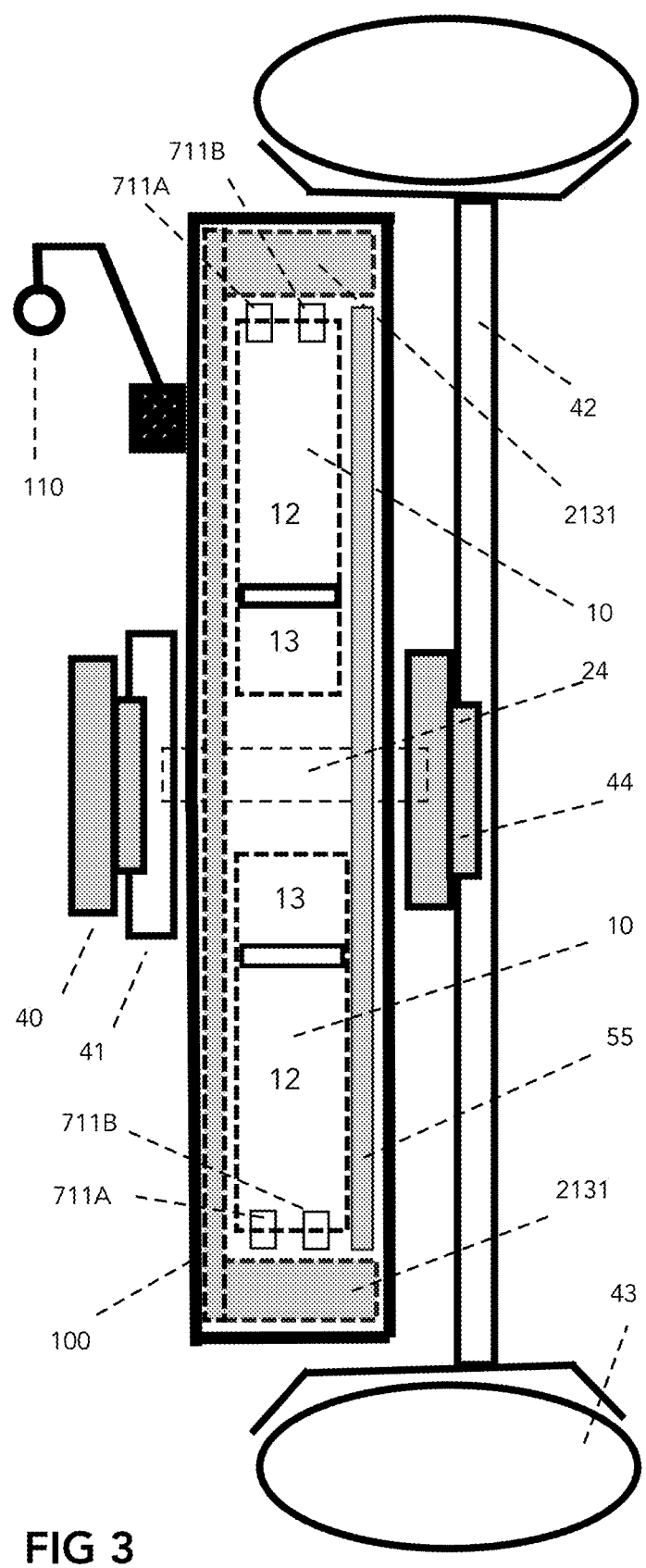
FIG. 3. The ReWheel Device—Alternative Embodiment 2.
100 ReWheel body
110 Stationary Connector
711A open/close acceleration valve
711B open/close braking valve
10 Accumulator
12 Pressured gas
13 Pressured liquid
24 Extended Axle
40 Original Hub
41 Connector to Original Hub
42 Original tire rim
43 Original tire
44 Secondary hub
2131 Turbine blade
55 Disk with guiding rail
FIG. 4A. The ReWheel Device—Alternative Embodiment 2—Neutral state
711A open/close acceleration valve
711B open/close braking valve
2131 turbine blade
10 accumulator
13 liquid
24 extended axle
50 special block
51 moving needle bearing
55 disk with guiding rail
56 guiding rail
FIG. 4B. The ReWheel Device—Alternative Embodiment 2—Neutral state—Special Blocks state
50 special block
51 moving needle bearing
FIG. 5A. The ReWheel Device—Alternative Embodiment 2—Braking state
711A open/close acceleration valve
711B open/close braking valve
2131 turbine blade
10 accumulator
13 liquid
50 special block
51 moving needle bearing
54 pressure applied by blades
55 disk with guiding rail
56 guiding rail
FIG. 5B. The ReWheel Device—Alternative Embodiment 2—Braking state—Special Blocks state
50 special block
51 moving needle bearing
FIG. 6A. The ReWheel Device—Alternative Embodiment 2—Accelerating state
711A open/close acceleration valve
711B open/close braking valve
2131 turbine blade
10 accumulator
13 liquid
24 extended axle
50 special block
51 moving needle bearing
54 pressure applied on blades
55 disk with guiding rail
56 guiding rail
FIG. 6B. The ReWheel Device—Alternative Embodiment 2—Accelerating state—Special Blocks state
50 special block
51 moving needle bearing

FIG. 3 Shows Alternative Embodiment-2.

In this embodiment the turbine represented by its blades (2131) and sitting on the extended axle (24) works as both, braking and accelerating turbine. Additionally, the accumulators (10) are positioned under the blades of the turbine and not in between the two turbines. That allows to minimize the dimension of the device in the direction of the extended axle approximately 3 times.

The FIG. 3 shows the original hub connector (41) connected on one side to the original hub (40) and on the other side to the extended axle (24), on the other side of which there is a secondary hub (44). The original tire (43) is sitting on the original rim (42), which is placed on the secondary hub (44). The ReWheel device body (100) has attached to it the described above stationary connector (110).

Accumulators inputs and outputs are shown as (711B) for the brake input, and (711A) for the acceleration output. That is analogous to the accumulators input (11B) and output (11A) in the first described embodiment, and analogous to the accumulators input (7B) and output (7A) in the first alternative embodiment.

Figure 4A:
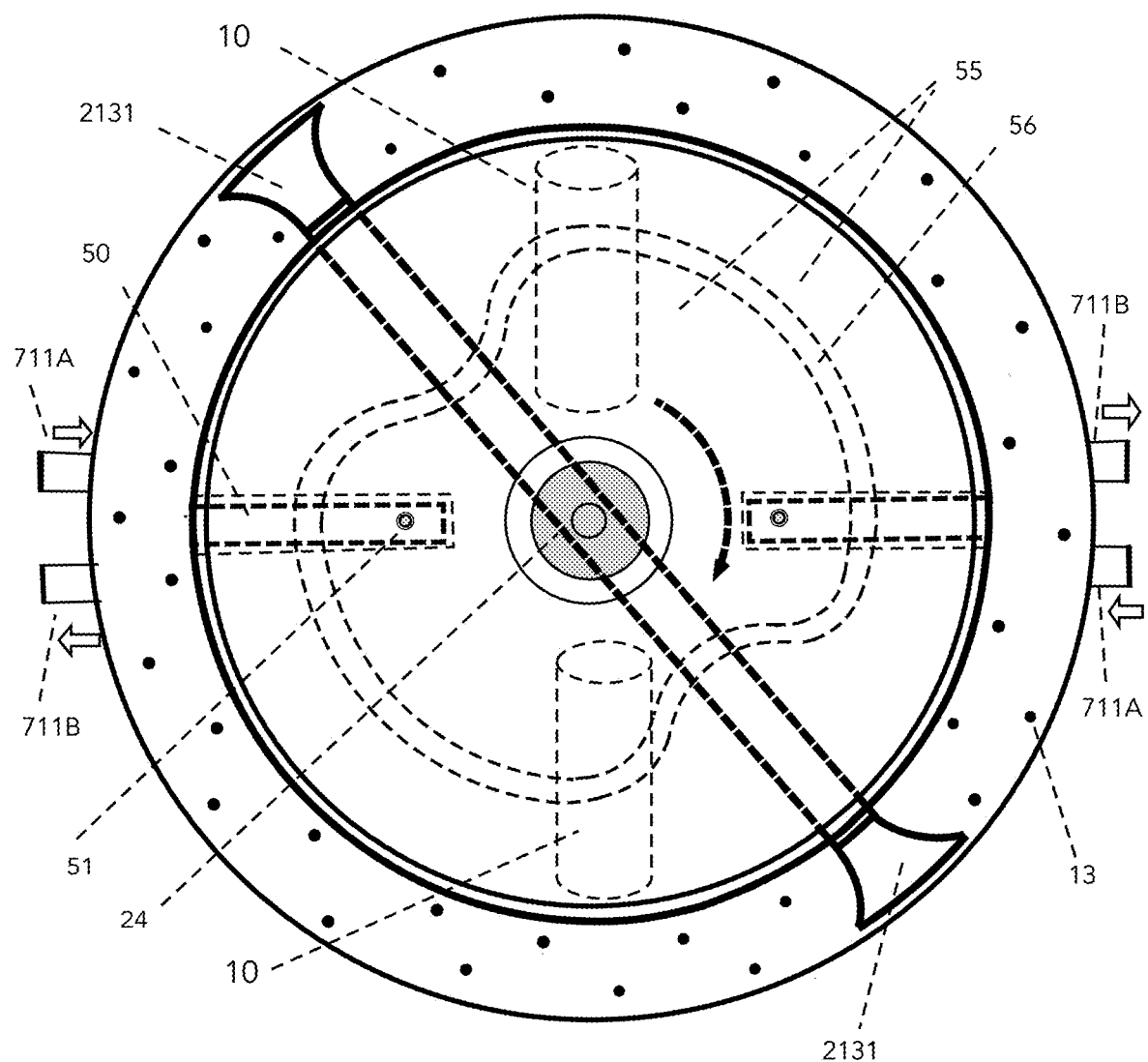
Figure 4B:
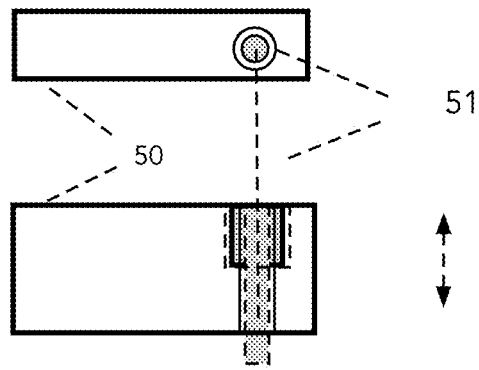

FIG. 4A and FIG. 4B. Neutral State of ReWheel Device.

FIG. 4A represents the view of an alternative embodiment-2 as a 90 degrees angle section against the extended axle (24). It shows the ReWheel device in its neutral state.

The neutral state of ReWheel is set via not engaged accumulators (10) when their valves (711A) are (711B) being closed, and by not engaged special blocks (50). In its neutral state, ReWheel does not affect the rotation of an automobile wheels, as the turbine blades (2131) are not being affected by liquid pressure in any way.

Special blocks described in the first embodiment are to move out and back in, to block the free rotation of the fluid in a way synchronized with the rotation of the blades, not to block the blades and to only block the liquid in between the blades.

The implementation of synchronization between a rotational movement and linear directional movement is well known in the art and is often simply done by a non-centrically positioned on an axle disk, causing the linear directional movement of other objects by pushing them via the perimeter of the disk. However, a specific embodiment used here, allowing one turbine to affect both, braking and acceleration, has an additional requirement on such special blocks, a requirement of at least 180 degrees rotation, described below, under FIG. 6.

Therefore, a construction of special blocks (50) is presented here in combination with a moving in and out needle bearing (51) and a disk (55) with guiding rail (56).

FIG. 4B shows the moving needle bearing (51) being in a state corresponding to a neutral state of the ReWheel device. In this state the wider part of the needle bearing (51), that is the side with the bearing, is inside the special block (50) and is not in contact with the guiding rail (56). The other side of the moving needle bearing (51), its prolonged axle, is out, allowing it to be locked into a locking hole.

A control mechanism implemented electronically would switch the state of the moving needle bearing (51). The state of the needle bearing (51) can be switched only at the corresponding position of the turbine blades (2131), when the turbine blades are passing by the special blocks (50). That is where the special blocks are in their most inner (neutral) position, and where the moving needle bearing (51) can be moved in between its two states: a locked-in by its axle side state by sliding into a specially designed for that lock; or in the other direction, being unlocked and having its bearing side within the guiding rail (56).

Figure 5A:
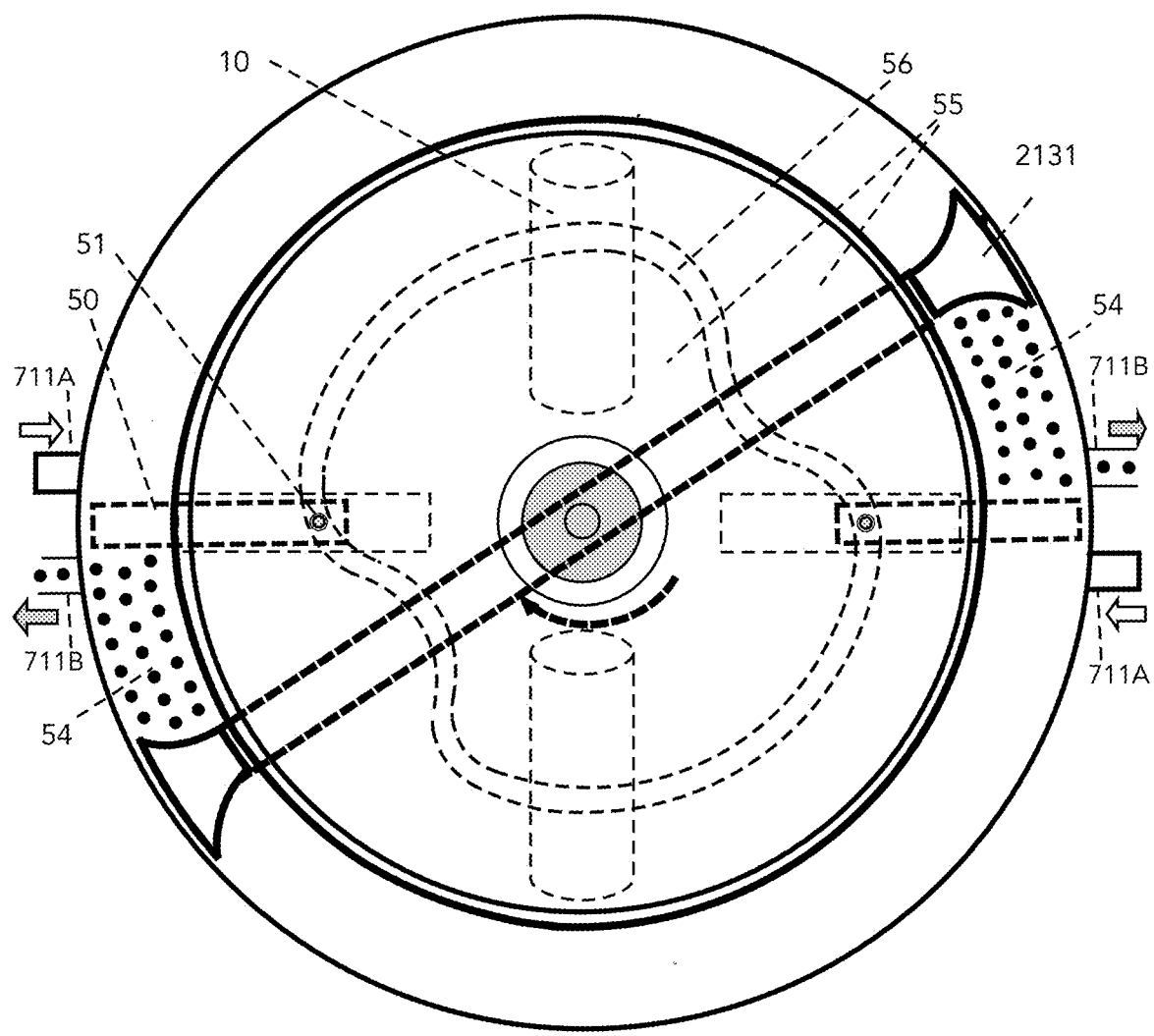
Figure 5B:
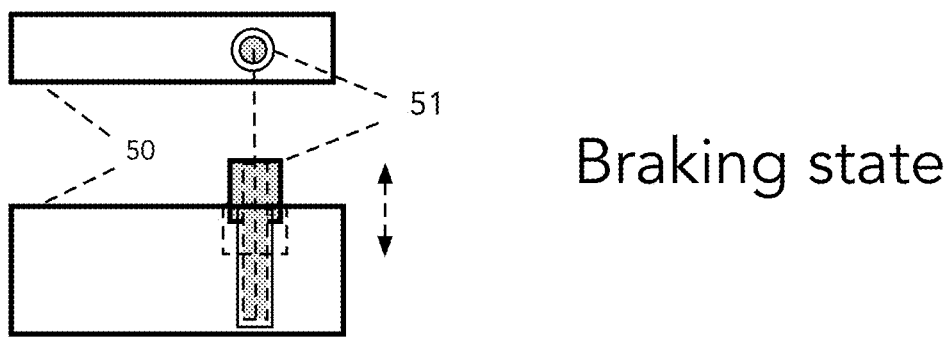

FIG. 5A and FIG. 5B. Braking State of ReWheel Device.

FIG. 5B shows the needle bearing (51) in it's unlocked state where it's bearing part is engaged within the guiding rail (56) as shown on FIG. 5A.

FIG. 5A shows special blocks (50) blocking the liquid (13) and forcing the liquid through the opened braking valve (711B) into the accumulators (10) in the same way that was previously described for the first implementation presented by FIG. 1 through the corresponding opened braking valve (11B). Analogous to the process described by FIG. 1 in relation to valves (7B) and (7A), in the braking state of ReWheel the braking valves (711B) are open and the accelerating valves (711B) are closed.

The special blocks (50) are moving out and back in, to block the free rotation of the fluid (13) and their movement is synchronized with the rotation of the blades (2131) not to block the blades and to only block the liquid (13) in between the blades.

The pressure of the liquid, (13) within the accumulators (10) affected by the pressure of the gas (12), seen on the FIG. 3, is slowing the rotation of the turbine sitting on the extended wheel (24) by pressing on the turbine's blades (2131) against their rotation. Liquid (13) being pushed into the accumulators (10) through the open valve (711B) is increasing the pressure within the accumulators (10), thus increasing the potential energy saved within the accumulators, while decreasing the kinetic energy of the automobile by slowing its wheels, by slowing the rotation of the extended axles (24).

Figure 6A:
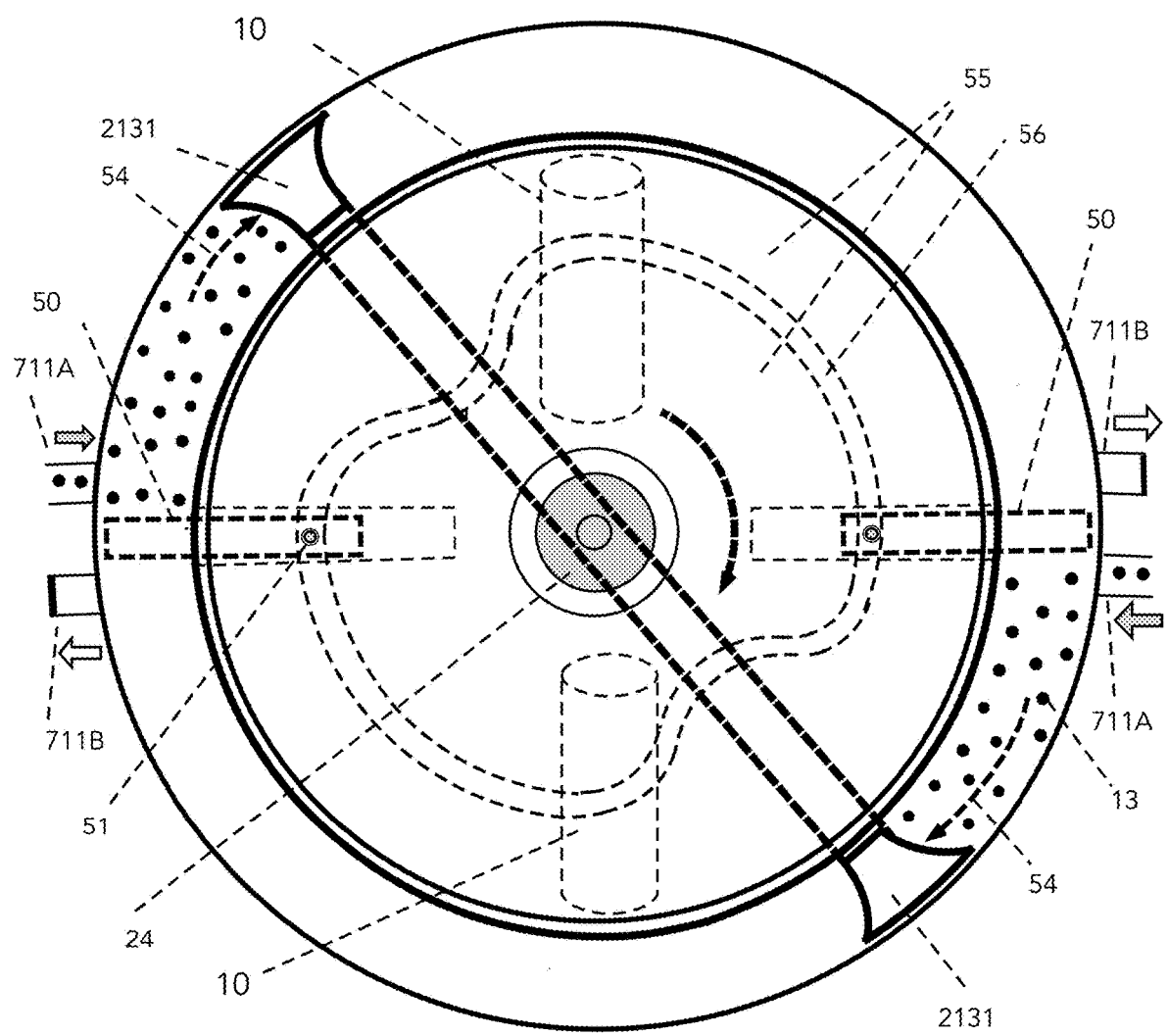
Figure 6B:
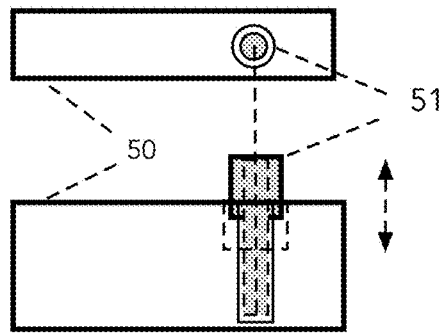

FIG. 6A and FIG. 6B. Accelerating State of Re Wheel Device

FIG. 6B shows the moving needle bearing (51) in the unlocked state, when the special blocks (50) are engaged within the guiding rail (56).

Switching between braking and acceleration states can only be done by going through the neutral state. In the neutral state the turbine blades (2131) must rotate forward at least 180 degrees. That is important so that the potentially pressed between the turbine blades (2131) and previously closed special block liquid would be equally distributed within the full 180 degrees distance between the turbine's blades (2131). That would prevent a potential pressure in the wrong direction when the accumulator valves are opened again, and the special blocks are again blocking the liquid.

On FIG. 6A we see the accelerating valves (711A) opened and braking valves (711B) closed. The pressured liquid (13) coming from the accelerating valves is pressing on the turbine blades (2131). This pressure, shown by the arrow (54), is causing the blades (2131) of the turbine sitting on the extended axle (24) to rotate forward faster, and thus causing the acceleration of an automobile.

What is claimed:

1. A system for a recovering energy wheel implementing an energy conservation device comprising:

(a) one or more accelerating/braking turbines (2131) used for both, acceleration and braking, sitting on a wheel's axle or on an extended wheel axle (24) and located in a housing of the-system;

(c) one or more accumulators (10) located in the housing of the system, utilizing compressed gas and liquid;

(d) a connector to an original hub (41);

wherein each accumulator (10) has an accelerator valve (711A) and a braking valve (711B) attached to it;

wherein the pressure in the accumulator is achieved by the presence of special blocks (50) set on a path of the moving liquid, which special blocks are moved in and out of the path synchronously with revolution of the accelerating/braking turbine blades;

wherein the accelerating/braking turbine (2131) pushes the liquid into the accumulator at a braking time when the braking valve (711B) is open and the accelerator valve (711A) is closed;

wherein the accelerating/braking turbine (2131) is propelled by pressurized liquid coming out of the accumulator (10) at the acceleration time when the braking valve (711B) is closed and the accelerator valve (711A) is opened.

2. The system of claim 1, further comprising a secondary hub (44) attached to the axle or the extended axle.

3. A method of adding the system of claim 2 to a vehicle's drive train by the following steps:

(a) taking off an original wheel (43);

(b) attaching the system with the secondary hub (44) to the original hub (40);

(c) attached the original wheel to the secondary hub (44).

4. A system for a recovering energy wheel implementing an energy conservation device comprising:

(a) one or more freely rotating braking turbines (730) sitting on braking turbine axle (7410) sitting on the wheel's axle or on an extended wheel axle (724) and located in a housing of the system;

(b) one or more accelerator turbines (721) sitting on the wheel's axle or on the extended wheel axle (724) and located in the housing of the system;

(c) one or more accumulators (710) located in the housing of the system, utilizing compressed gas and liquid;

(d) a connector to an original hub (742);

wherein each accumulator (710) has an accelerator valve (7A) and a braking valve (7B) attached to it;

wherein the pressure in the accumulator is achieved by the braking turbine (730) pushing the liquid into the accumulator at a braking time by being forced to rotate in direction in reverse to the direction of the wheel's axle or the extended wheel axle and when the braking valve (7B) is open and the accelerator valve (7A) is closed;

wherein the accelerator turbine (721) is propelled by pressurized liquid coming out of the accumulator (710) at the acceleration time when the braking valve (B) is closed and the accelerator valve (A) is opened.

* * * * *